UNITED STATES PATENT OFFICE.

JAMES D. DARLING, OF PHILADELPHIA, PENNSYLVANIA.

MANUFACTURE OF CHEWING-GUM.

1,040,285.   Specification of Letters Patent.   Patented Oct. 8, 1912.

No Drawing.   Application filed January 31, 1910. Serial No. 541,000.

*To all whom it may concern:*

Be it known that I, JAMES D. DARLING, of the city and county of Philadelphia and State of Pennsylvania, have invented certain new and useful Improvements in the Manufacture of Chewing-Gum, of which the following is a specification.

Heretofore chewing gum has usually been manufactured from gum chicle, because it naturally possesses, when properly cleansed, the properties required for a chewing gum, to wit, absence of taste or odor, and at the temperature of the human mouth is plastic and ductile. But the supply of gum chicle is rapidly diminishing and other gums, or similar substances, which might otherwise be available, are either of objectionable taste, or too brittle, or on the other hand, too tough or elastic.

Prior to my present invention, I discovered that certain low grade rubbers, notably Pontianak rubber, containing about two-thirds resin and one-third rubber, could be converted into a chewing gum by sufficiently modifying the toughness and elasticity of the rubber content by working it mechanically at certain temperatures, and secured Letters Patent for this invention.

I have now discovered that chewing gum may be manufactured from a large range of gums or resins by the extraction therefrom of the acid or saponifiable component, and the addition of a small quantity of rubber.

Most natural gums or resins are in themselves unsuitable for use as chewing gums, both because of their objectionable taste or odor, and because of their brittleness, but almost all resins contain in greater or less quantity a substance known as resene, which is that part of the resin which remains after the extraction by boiling in alkali of all of the acid or saponifiable components of the resin. This resene in some resins forms from 50% to 90% of the mass, and it may, therefore, be easily obtained in large quantities. Being non-saponifiable, it is not acted upon by the human alkaline saliva, and is, therefore, tasteless, and when properly prepared exhibits the properties called for in a chewing gum, except that it is by nature too brittle. This brittleness may be readily overcome by the addition of a small quantity of rubber, and also in some cases of waxy substances, and in this way I find that a very desirable chewing gum may be produced at a very low cost.

The resins which are most suitable for my process are those which contain a comparatively high percentage of resene, and in which the resene has a comparatively low melting point. For example, the resene which may be extracted from gum dammar is suitable and abundant. Likewise, the resin which remains after the extraction of the rubber from many so-called rubbers, which consist of resin and rubber, is suitable for my purpose, thus the resin which remains after the extraction of the rubber from Mexican guayule, or from many of the Borneo rubbers, yields in large quantities a suitable resene. Similarly, some of these rubbers by natural oxidation are converted into a resin which yields when treated by alkali, a suitable resene. For example, I take ordinary gum dammar of commerce, and introduce it into a boiling alkaline solution, made by adding say 10% of caustic alkali to hot water. The gum dammar melts, and by boiling and repeated washings, the entire acid or saponifiable content of the gum is removed, leaving a pure tasteless, odorless resene, which, however, is quite brittle and until incorporated with other substances, capable of imparting to it the requisite plasticity and ductility, is unsuitable for use as a chewing gum. I, therefore, add to the resene thus procured from gum dammar, a suitable quantity, say from 5% to 15%, of pure Para rubber, the addition being made while the resene is melted, and preferably after softening the rubber by the addition of a small quantity, say about 30%, of benzol. Other rubbers, having a lower melting point than Para rubber, may be used, or mixtures of gum and rubber, and the quantity of the rubber added will vary according to its nature and also according to the requirements of the resene, the important point being to add to the resene a sufficient quantity of the rubber or other similar material required to render it plastic and ductile, so as to serve my purpose.

Instead of using a natural resin, such as gum dammar, I find that suitable resins may be procured as a result of various processes by which rubber is obtained from mixtures of resin and rubber, as for example Mexican guayule. After the separation of rubber from this substance, as for example by dissolving out the resin in acetone, there remains a resin containing a high percentage of resene, and by treatment with a boiling alkaline bath, as above described, this resene may be procured, and a chewing gum produced by adding to it the desired quantity of rubber. It is desirable to use as small a quantity of rubber as possible, on account of its expense. With the resene produced from some resins, I find that 1% or 1½% of rubber is sufficient to convert the resene into a chewing gum. But with other resene, a larger quantity is necessary; but the quantity may be reduced by the employment of a vegetable or other wax, or the same result may be produced by the addition of a suitable gum containing rubber, provided of course the non-rubber content of the gum thus added is in itself a proper component of chewing gum. Gum chicle contains about 18% of rubber, and may, therefore, be added in order to overcome the brittleness of the resene.

It will be understood that my invention is not limited to any specific proportion of materials, for although as a rule the quantity of rubber required is small, yet it must vary according to the source and therefore the physical qualities of the resene, and the nature of the rubber. I believe that I am the first person to produce chewing gum by combining a resene and a rubber, and I, therefore, do not limit myself to any specific resinous source from which the resene may be produced, or to any specific addition of rubber thereto.

Having thus described my invention, I claim:

1. The process of manufacturing chewing gum, which consists in adding to a resene a suitable proportion of rubber to render it plastic.

2. The process of manufacturing chewing gum, which consists in removing from a resin, the acid component by means of an alkaline solution, with production of an insoluble resene and adding thereto a suitable proportion of rubber to render it plastic.

3. As a new article of manufacture, an odorless, tasteless chewing gum, plastic at the temperature of the mouth, and containing a large amount of resene, and from 1% to 15% of rubber.

In testimony whereof, I have hereunto signed my name at Philadelphia, Pennsylvania, this twenty-ninth day of January, 1910.

JAMES D. DARLING.

Witnesses:
 JAMES H. BELL,
 E. L. FULLERTON.